United States Patent
Franken et al.

(10) Patent No.: US 12,104,097 B2
(45) Date of Patent: Oct. 1, 2024

(54) HOT-MELT ADHESIVE COMPOSITION COMPRISING BIO-BASED POLYESTER POLYOLS

(71) Applicant: Henkel AG & Co. KGaA, Duesseldorf (DE)

(72) Inventors: Uwe Franken, Dormagen (DE); Adrian Brandt, Essen (DE); Alexander Kux, Monheim (DE); Karin Jonscher, Duesseldorf (DE); Horst Beck, Neuss (DE)

(73) Assignee: Henkel AG & Co. KGaA, Duesseldorf (DE)

( * ) Notice: Subject to any disclaimer, the term of this patent is extended or adjusted under 35 U.S.C. 154(b) by 593 days.

(21) Appl. No.: 17/301,422

(22) Filed: Apr. 2, 2021

(65) Prior Publication Data
US 2021/0222039 A1 Jul. 22, 2021

Related U.S. Application Data

(63) Continuation of application No. PCT/EP2019/076132, filed on Sep. 27, 2019.

(30) Foreign Application Priority Data
Oct. 15, 2018 (EP) .................................... 18200334

(51) Int. Cl.
| | |
|---|---|
| C09J 175/06 | (2006.01) |
| B32B 27/40 | (2006.01) |
| C08G 18/32 | (2006.01) |
| C08G 18/42 | (2006.01) |
| C08G 18/76 | (2006.01) |
| C09J 5/06 | (2006.01) |
| C09J 9/00 | (2006.01) |
| C09J 175/04 | (2006.01) |

(52) U.S. Cl.
CPC ........ C09J 175/04 (2013.01); C08G 18/3221 (2013.01); C08G 18/7657 (2013.01); C09J 5/06 (2013.01)

(58) Field of Classification Search
None
See application file for complete search history.

(56) References Cited

U.S. PATENT DOCUMENTS

| | | | |
|---|---|---|---|
| 6,387,449 B1* | 5/2002 | Reid | ...................... C09J 175/06 156/320 |
| 2003/0106640 A1* | 6/2003 | Brinkman | .......... C08G 18/4063 156/327 |
| 2008/0004369 A1 | 1/2008 | Seppala | |
| 2017/0058162 A1 | 3/2017 | Slark et al. | |

FOREIGN PATENT DOCUMENTS

| | | | | |
|---|---|---|---|---|
| CN | 106459723 A | | 2/2017 | |
| EP | 0034948 A2 | | 9/1981 | |
| JP | 2010090385 A | * | 4/2010 | ............. C08F 18/02 |
| JP | 2012214613 A | | 11/2012 | |
| WO | 0077063 A1 | | 12/2000 | |
| WO | 2006053936 A1 | | 5/2006 | |
| WO | 2018136679 A1 | | 7/2018 | |

OTHER PUBLICATIONS

Machine translation of JP-2010090385-A (no date).*
CAS Registry Data for 473-98-3 (no date).*
Francisca Arän-Ais et al: "Addition of rosin acid during thermoplastic polyurethane synthesis to improve its immediate adhesion to PVC," International Journal of Adhesion and Adhesives, vol. 25, No. 1, Feb. 1, 2005 (Feb. 1, 2005), pp. 31-38, XP055577794, Amsterdam, NL ISSN: 0143-7496.
International Search Report for International PCT Patent Application No. PCT/EP2019/076132 dated Dec. 17, 2019.
Russian Journal of Applied Chemistry, vol. 78, No. 7, 2005, pp. 1162-1165.

* cited by examiner

Primary Examiner — Michael J Feely
(74) Attorney, Agent, or Firm — Sun Hee Lehmann

(57) ABSTRACT

The present invention relates to a hot-melt adhesive composition comprising at least one polyester polyol based on Betulin and at least one NCO-terminated compound as well as a method for the production of a laminated article using the inventive hot-melt adhesive composition.

19 Claims, No Drawings

HOT-MELT ADHESIVE COMPOSITION COMPRISING BIO-BASED POLYESTER POLYOLS

The present invention relates to a hot-melt adhesive composition comprising at least one polyester polyol based on Betulin and at least one NCO-terminated compound as well as a method for the production of a laminated article using the inventive hot-melt adhesive composition.

Hot-melt adhesives are very well-known and commercially used to bond a wide variety of substrates. One advantage of hot-melt adhesives is their lack of a liquid carrier in the adhesive composition, eliminating the need for a drying period after application so that the production line speed can be increased. Especially with regard to organic solvents, their elimination reduces environmental and human risk associated with their use. In addition to reduced waste and environmental strain, elimination of the liquid carrier also reduces the weight and bulk of the adhesive for shipping and storage.

Hot-melt adhesives are typically melted and then held molten for a period of time in a heated equipment at a temperature close to the application temperature of the adhesive. The period of time the adhesive is held in a molten state may range from a few minutes to as long as several hours. Usually for hot-melt adhesives derived from petroleum-based components, this extended heating time poses few problems for the integrity of the adhesive.

However, in light of the on-going discussion of sustainability and limited resources, the need arises to find an alternative for any petrochemical compounds used in the production of hot-melt adhesives. Although a number of compounds has been identified and appears to be promising, a variety of problems has been encountered, especially with respect to the mechanical properties of the hot-melt adhesives which were found to deteriorate when bio-based compounds instead of the conventional compounds were used.

WO 2018/136679 discloses a hot-melt adhesive having a high content of components which are bio-sourced and/or biodegradable. The disclosed adhesives are said to have an improved heat stability and comprise a lactic acid oligomer or polymer having a weight average molecular weight from 1500 to 3000; a polylactide having a weight average molecular weight from 10,000 to 18,000; a polyester formed from copolymerization of one or more diols and one or more dicarboxylic acids; and a copolymer of vinyl acetate and a mono-unsaturated short chain fatty acid, the fatty acid having from 4 to 12 carbon atoms.

WO 2006/053936 discloses a method to produce a polymer based on biodegradable or essentially renewable crude materials which can be crosslinked by free radicals. The crosslinked polymer is produced by polycondensation from biodegradable or biomass based starting materials which are essentially composed of structural units derived from hydroxyl acid units or structural units derived from dicarboxylic acid units and diol units.

Apart from being applicable in adhesive compositions, the bio-based alternative compounds must also be available in industrial quantities. One promising candidate for the replacement of petroleum-based starting materials is Betulin which is an abundant, naturally occurring triterpene commonly isolated from the bark of birch trees. Betulin is listed under the IUPAC name of Lup-20(29)-ene-3b,28-diol and CAS number 473-98-3.

V. E. Nemilov et al did a study on the kinetics of polycondensation of Betulin with adipic acid, the results of which are disclosed in *Russian Journal of Applied Chemistry*, Vol. 78, No. 7, 2005, pp. 1162-1165, focusing on the different behavior of the primary and secondary hydroxyl group.

Despite on-going efforts, there is still the need for readily-available products, in particular adhesives, derived from renewable sources which show comparable properties to those of their petro-based analogues to be employed in established industrial processes. In the course of recent studies, it was found that in particular the stability of compositions comprising such bio-based compounds at elevated temperatures and in the presence of water leaves much to be desired, especially in the field of hot-melt adhesives.

It is therefore an object of the present invention to provide a hot-melt adhesive composition wherein at least part of the components is derived from renewable resources and which shows at least the same performance as conventional compositions, in particular with regard to hydrolysis stability.

This object is solved by a hot-melt adhesive composition which comprises a polyester polyol based on Betulin.

A first subject of the present invention is therefore a hot-melt adhesive composition comprising
a) at least one polyester polyol based on Betulin; and
b) at least one NCO-terminated compound.

It was surprisingly found that polyester polyols based on Betulin can be readily employed in hot-melt adhesive compositions without affecting the performance or the stability of the adhesive.

Hot-melt adhesive compositions are generally applied in the molten state after heating to a temperature of up to 170° C., usually 110 to 150° C. However, in light of the environmental aspects of any industrial process, it is desirable to keep the temperature at which the hot-melt adhesive composition is molten and can be applied as low as possible in order to preserve environmental and ecological resources. The inventive hot-melt adhesive composition therefore has a softening point of no more than 120° C., preferably from 60 to 120° C., in particular from 60 to 90° C., determined according to the ring and ball method, as e.g. described in ISO 4625 or ASTM E28-67/E28-99.

In a preferred embodiment, the inventive hot-melt adhesive composition has a viscosity at 130° C. of 1000 to 100,000 mPas, preferably 1000 to 50,000 mPas, determined according to DIN EN ISO 2555/2000-01 (Brookfield Thermosel, spindle 27, 10 rpm).

The polyester polyol comprised in the inventive hot-melt adhesive composition is preferably derived from renewable sources. Preferably, the polyester polyol based on Betulin is obtained by reaction of Betulin with at least one compound selected from the group consisting of dicarboxylic acids, short-chain polyols, amines, triglycerides and mixtures thereof.

The polyester polyol based on Betulin is preferably obtained from a reaction mixture comprising the following monomeric units:
  i) Betulin in an amount of 5 to 75 wt.-%, preferably 25 to 65 wt.-%;
  ii) dicarboxylic acid in an amount of 9 to 60 wt.-%, preferably 25 to 45 wt.-%; and
  iii) short chain polyol in an amount of 9 to 25 wt.-%, preferably 10 to 20 wt.-%, based on the total weight of the monomeric units, respectively.

The dicarboxylic acid is preferably selected from the group consisting of succinic acid, adipic acid, acelaic acid, sebacic acid, lauric acid, myristic acid, furandicarboxylic acid, isophthalic acid, terephthalic acid, orthophthalic acid, dimerized fatty acids and mixtures thereof.

The short chain polyol is preferably a diol having 2 to 8, preferably 3 to 6 carbon atoms. In particular, the short chain polyol is selected from the group consisting of ethyleneglycol, 1,2-propanediol, 1,3-propanediol, butanediol, 1,6-hexanediol, neopentyldiol, diethyleneglycol, triethyleneglycol, 2-methylene-1,3-propanediol, 1,4-pentanediol, glyceride and mixtures thereof.

In an alternatively preferred embodiment, the polyester polyol based on Betulin is obtainable from a reaction mixture comprising the following monomeric units:
 i) Betulin in an amount of 5 to 50 wt.-%, preferably 25 to 35 wt.-%;
 ii) dicarboxylic acid in an amount of 5 to 45 wt.-%, preferably 8 to 40 wt.-%; and
 iii) triglyceride in an amount of 20 to 80 wt.-%, preferably 40 to 70 wt.-%, based on the total weight of the monomeric units, respectively.

The dicarboxylic acid is preferably selected from the group consisting of succinic acid, adipic acid, acelaic acid, sebacic acid, lauric acid, myristic acid, furandicarboxylic acid, isophthalic acid, terephthalic acid, orthophthalic acid, dimerized fatty acids and mixtures thereof.

The triglyceride is preferably selected or derived from the group consisting of soybean oil, sunflower oil, linseed oil, castor oil, palm oil, olive oil and mixtures thereof. In a particular preferred embodiment, the triglyceride is selected from the group consisting of castor oil, soybean oil and derivatives of said compounds.

The amount of Betulin moieties in the polyester polyol based on Betulin which is comprised in the inventive hot-melt adhesive composition is preferably 5 to 80 mol-%, preferably 10 to 60 mol-%, based on the polyester polyol. It was surprisingly found that keeping the amount of Betulin moieties within the claimed range ensures easy management of the inventive hot-melt adhesive composition.

The at least one polyester polyol based on Betulin preferably has a hydroxyl number (OH-number) of 20 to 85 mg KOH/g, preferably 25 to 80 mg KOH/g. The hydroxyl number is defined as the number of milligrams of potassium hydroxide required to neutralize the acetic acid taken up on acetylation of one gram substance that contains free hydroxyl groups. The hydroxyl number can, e.g. be determined by titration.

The inventive hot-melt adhesive composition further comprises at least one NCO-terminated compound. The at least one NCO-terminated compound is preferably selected from the group consisting of 1,5-naphthylene diisocyanate (NDI), 2,4'- and 4,4'-diphenylmethylene diisocyanate (MDI), isomers of toluylene diisocyanate (TDI), triphenylmethylene triisocyanate (MTI), hydrated diphenylmethylene triisocyanate (H12MDI), tetramethylenexylylene diisocyanate (TMXDI), isophoron diisocyanate (IPDI), xylylene diisocyanate (XDI), hexane-1,6-diisocyanate (HDI), pentamethylene diisocyanate (PDI) and dicyclohexylmethane diisocyanate as well as mixtures thereof.

In a preferred embodiment, the NCO-terminated compound is employed in the form of oligomers, in particular trimers, or polymers. Especially preferred is an embodiment wherein the NCO-terminated compound is employed in the form of a prepolymer which is obtainable by reacting an excess of polyisocyanate with an OH-group and/or NH-group carrying compound. Suitable polyisocyanates are those mentioned above. As suitable NH-group carrying compounds, polyetheramines may be used.

In a particular preferred embodiment, the NCO-terminated compound is derived from diphenylmethylene diisocyanate (MDI) or its isomers.

The amount of the at least one polyester polyol based on Betulin and the amount of the at least one NCO-terminated compound in the inventive hot-melt adhesive composition may be adapted according to need. However, in a preferred embodiment, the inventive hot-melt adhesive composition comprises the at least one polyester polyol based on Betulin in an amount of 10 to 30 wt.-%, preferably 15 to 25 wt.-%, based on the total weight of the hot-melt adhesive composition.

In a preferred embodiment, the ratio of the at least one NCO-terminated compound to the at least one polyester polyol in the inventive hot-melt adhesive composition, expressed as NCO/OH, is 5:1 to 1:1, preferably 2.5:1 to 1.05:1.

The inventive hot-melt adhesive composition may be employed in any form. However, in a preferred embodiment, the inventive hot-melt adhesive composition is a 1K-polyurethane hot-melt adhesive. In a particular preferred embodiment, the inventive hot-melt adhesive composition is moisture-curable. In a preferred embodiment, the polyester polyol based on Betulin is reacted with the at least one NCO-terminated compound to form the 1K adhesive, the inventive 1K adhesive thus being an NCO-terminated compound comprising Betulin units.

One of the advantages of hot-melt adhesive compositions is the absence of any liquid carrier. Therefore, an embodiment of the inventive hot-melt adhesive composition is preferred wherein the inventive hot-melt adhesive composition is free of any liquid carriers, such as water or solvents. Also preferred is an embodiment wherein the solid content of the inventive hot-melt adhesive composition is 100%.

The inventive hot-melt adhesive composition is characterized by a low softening point. Accordingly, the application temperature of the composition is advantageously low. In a preferred embodiment, the inventive hot-melt adhesive composition has an application temperature of no more than 170° C., preferably 110 to 150° C.

A further subject of the present invention is a method for the production of a laminated article using the inventive hot-melt adhesive composition. The inventive method comprises the steps of
 i) providing at least two substrates;
 ii) applying the inventive hot-melt adhesive composition to at least part of at least one of the substrates; and
 iii) contacting the at least two substrates to form a laminated article,
wherein the hot-melt adhesive composition has an application temperature of no more than 170° C., preferably 110 to 150° C.

The inventive method may be performed with any kind of substrate, preferably planar substrates, such as decorative films, woven textile fabrics, paper films, ABS films, expanded PVC films, wooden panels, wood-fiber shaped bodies or metal foils.

Another subject of the present invention is the use of a polyester polyol based on Betulin in hot-melt adhesive compositions. The polyester polyol based on Betulin is preferably obtainable as described above.

The inventive hot-melt adhesive composition is especially useful for bonding two or more substrates. A further subject of the present invention is therefore the use of the inventive hot-melt adhesive composition for bonding two or more substrates.

The invention will be further explained in more detail by the following examples which by no means should be understood as limiting the spirit of the invention.

EXAMPLES

The following polyester polyols were prepared; the composition being summarized in Table 1.

TABLE 1

| Polyester polyol | Composition |
| --- | --- |
| PES 1 | 131.63 g Betulin (29.3 mol-%) |
|  | 25.55 g butane diol (27.9 mol-%) |
|  | 87.8 g sebacic acid (42.8 mol-%) |
| PES 2 | 110.65 g Betulin (25 mol-%) |
|  | 28.51 g butane diol (31.6 mol-%) |
|  | 63.44 g adipic acid (43.4 mol-%) |
| PES 3 | 338.55 g Betulin (23.98 mol-%) |
|  | 87.12 g butane diol (30.31 mol-%) |
|  | 274.35 g acelaic acid (45.71 mol-%) |
| PES 4 | 177 g Betulin (46.6 mol-%) |
|  | 7.73 g butane diol (10 mol-%) |
|  | 215.27 g dimeric fatty acid (43.4 mol-%) |
| PES 5 | 177 g Betulin (46.6 mol-%) |
|  | 7.73 g butane diol (10 mol-%) |
|  | 215.22 g dimeric fatty acid (43.4 mol-%) |

The polyester polyols were found to have the following mechanical properties, summarized in Table 2.

TABLE 2

| PES | viscosity[1] [mPas] | Tg[2] [° C.] | acid number[3] | OH number[3] | Mn [g/mol][4] | polydispersity[5] |
| --- | --- | --- | --- | --- | --- | --- |
| PES 1 | 1550 | 12 | 2.6 | 80 | 1933 | 2.1 |
| PES 2 | 7500 | 29 | 2.8 | 59 | 2207 | 2.1 |
| PES 3 | 630 | −15 | 2.3 | 73 | 1725 | 2.2 |
| PES 4 | 5500 | 20 | 2.9 | 28 | 3666 | 2.3 |
| PES 5 | 7500 | 19 | 1.5 | 29 | 4188 | 2.5 |

[1] at 130° C. determined with Brookfield Thermosel, spindle 27, 10 rpm
[2] glass transition temperature, determined with DSC
[3] [mg KOH/g], determined via titration
[4] determined with GPC
[5] determined with GPC The obtained polyester polyols were reacted with diphenylmethylene diisocyanate (4,4'-MDI) (NCO content 33.6 wt.-%) with a ratio of NCO to OH of 2.2/1.

The obtained adhesive compositions were tested and compared to compositions employing a commonly used polyester polyol based on phthalic acid, commercially available under the trade name Dynacoll® 7130 from Evonik, Germany. The results are summarized in Table 3.
Tensile strength and e-modulus were determined according to EN ISO 527.

TABLE 3

|  | Example 1 | Example 2 | Comp.-Ex. 1 |
| --- | --- | --- | --- |
| Polyester polyol | PES 2 | PES 3 | Dynacoll |
| viscosity (@ 130° C.; [mPas]) | 14000 | 8900 | 17000 |
| setting time [s] | 65 | 40 | 60 |
| open time [s] | 80 | 60 | 100 |
| tensile strength [MPa] | 8 | 12.2 | 4.1 |
| E-modulus [%] | 3.6 | 4.1 | 44 |

As can be clearly seen from the provided data, the inventive hot-melt adhesive composition shows advantageous properties that even exceed those of conventionally used petrochemical-based alternatives, in particular with regard to tensile strength and e-modulus.

It was further found that the inventive hot-melt adhesive composition shows a surprisingly high hydrolysis stability. PES 1 and 5 as characterized in Table 1 above were reacted with 4,4'-MDI as described above to obtain an inventive hot-melt adhesive composition. The hydrolysis behavior of the obtained inventive hot-melt adhesive compositions was analyzed and compared with a conventional composition employing the polyester polyol sold under the trade name Dynacoll® 7130. After storing the samples for 6 days at 90° C. and 100% relative humidity, the inventive hot-melt adhesive composition did not change in the optical appearance whereas the comparative composition showed clear signs of decomposition. This was confirmed after storage under the same conditions for 21 days where the comparative composition was found to be completely decomposed. In contrast thereto, the inventive hot-melt adhesive compositions maintained their original appearance. The results are briefly summarized in Table 4.

TABLE 4

| Storage time | Example 3 (PES 1) | Example 4 (PES 5) | Comp.-Ex. 2 (Dynacoll ®) |
| --- | --- | --- | --- |
| 6 days | solid, slightly elastic no decomposition | brittle, no decomposition | soft, elastic decomposition |
| 21 days | solid, slightly elastic no decomposition | brittle, no decomposition | brittle, decomposed |

The invention claimed is:

1. A 1K-polyurethane hot-melt adhesive composition comprising an NCO-terminated compound comprising Betulin units, wherein the NCO-terminated compound comprising Betulin units is the reaction product of:
   a) at least one polyester polyol that is the reaction product of a reactant mixture comprising Betulin, a dicarboxylic acid, and at least one compound selected from the group consisting of a short-chain polyol, an amine, and a triglyceride; and
   b) at least one NCO-terminated polyisocyanate compound.

2. The 1K-polyurethane hot-melt adhesive composition according to claim 1 having a softening point of no more than 120 determined according to the method of Ring & Ball.

3. The 1K-polyurethane hot-melt adhesive composition according to claim 1 having a viscosity of 1000 to 100000 mPas, determined at 130° C. according to DIN EN ISO 2555/2000-01 (Brookfield Thermosel, spindle 27, 10 rpm).

4. The 1K-polyurethane hot-melt adhesive composition according to claim 1 wherein the at least one polyester polyol is the reaction product of a reactant mixture comprising Betulin, a dicarboxylic acid, and a short-chain polyol.

5. The 1K-polyurethane hot-melt adhesive composition according to claim 1 wherein the at least one polyester polyol comprises 5 to 80 mol-% of Betulin moieties.

6. The 1K-polyurethane hot-melt adhesive composition according to claim 1 wherein the at least one polyester polyol is the reaction product of a reactant mixture comprising Betulin, a dicarboxylic acid, and a triglyceride.

7. The 1K-polyurethane hot-melt adhesive composition according to claim 1 wherein the dicarboxylic acid is selected from succinic acid, adipic acid, acelaic acid, sebacic acid, lauric acid, myristic acid, furandicarboxylic acid, isophthalic acid, terephthalic acid, orthophthalic acid, dimerized fatty acids and mixtures thereof.

8. The 1K-polyurethane hot-melt adhesive composition according to claim 1 wherein the at least one NCO-terminated polyisocyanate compound is derived from methylenediphenyl diisocyanate (MDI) or its isomers.

9. The 1K-polyurethane hot-melt adhesive composition according to claim 1 wherein the at least one NCO-terminated polyisocyanate compound is in the form of a monomer, an oligomer, a prepolymer or mixtures thereof;
wherein the monomer is a polyisocyanate selected from the group consisting of 1,5-naphthylene diisocyanate (NDI), 2,4'-diphenylmethylene diisocyanate (MDI), 4,4'-diphenylmethylene diisocyanate (MDI), isomers of toluylene diisocyanate (TDI), triphenylmethylene triisocyanate (MTI), hydrated diphenylmethylene triisocyanate (H12MDI), tetramethylenexylylene diisocyanate (TMXDI), isophorone diisocyanate (IPDI), xylylene diisocyanate (XDI), hexane-1,6-diisocyanate (HDI), pentamethylene diisocyanate (PDI), dicyclohexylmethane diisocyanate, and mixtures thereof; and
wherein the prepolymer is a reaction product of excess polyisocyanate with an OH-group and/or NH-group carrying compound.

10. The 1K-polyurethane hot-melt adhesive composition according to claim 1 wherein a) and b) are reacted with a ratio of NCO to OH of 5:1 to 1:1.

11. The 1K-polyurethane hot-melt adhesive composition according to claim 1 wherein a) and b) are reacted with a ratio of NCO to OH of 2.5:1 to 1.05:1.

12. The 1K-polyurethane hot-melt adhesive composition according to claim 1 wherein the hot-melt adhesive is moisture curable.

13. The 1K-polyurethane hot-melt adhesive composition according to claim 1 which has a solid content of 100%.

14. The 1K-polyurethane hot-melt adhesive composition according to claim 1 wherein the hot-melt adhesive composition does not contain any water or solvent.

15. The 1K-polyurethane hot-melt adhesive composition according to claim 1 having an application temperature of no more than 170° C.

16. An article comprising the 1K-polyurethane hot-melt adhesive composition according to claim 1.

17. A cured reaction product of the 1K-polyurethane hot-melt adhesive composition according to claim 1.

18. A method for the production of a laminated article comprising:
i) providing a first substrate;
ii) providing a second substrate;
iii) applying the 1K-polyurethane hot-melt adhesive composition according to claim 1 to at least part of at least one of the first or second substrates, and
iv) contacting the first and second substrates with the applied adhesive to form a laminated article,
wherein the hot-melt adhesive is applied at temperatures of no more than 170° C.

19. The method of claim 18 further comprising exposing the laminated article to moisture to cure the applied adhesive to an irreversible solid form.

* * * * *